United States Patent
Noichl et al.

(10) Patent No.: US 9,764,622 B2
(45) Date of Patent: Sep. 19, 2017

(54) METHOD FOR PRODUCING A CONTROL ELEMENT FOR AN AIR-DIFFUSER

(75) Inventors: Harald Noichl, Enkenbach-Alsenborn (DE); Steve Kober, Treuen (DE)

(73) Assignee: Illinois Tool Works Inc., Glenview, IL (US)

( * ) Notice: Subject to any disclaimer, the term of this patent is extended or adjusted under 35 U.S.C. 154(b) by 697 days.

(21) Appl. No.: 13/808,617

(22) PCT Filed: Jul. 21, 2011

(86) PCT No.: PCT/EP2011/003667
§ 371 (c)(1),
(2), (4) Date: Jun. 26, 2013

(87) PCT Pub. No.: WO2012/013317
PCT Pub. Date: Feb. 2, 2012

(65) Prior Publication Data
US 2013/0267158 A1    Oct. 10, 2013

(30) Foreign Application Priority Data
Jul. 26, 2010 (DE) .................. 10 2010 032 231

(51) Int. Cl.
*B29C 45/16* (2006.01)
*B60H 1/34* (2006.01)
(Continued)

(52) U.S. Cl.
CPC ..... *B60H 1/3421* (2013.01); *B29C 45/14065* (2013.01); *B29C 45/1635* (2013.01);
(Continued)

(58) Field of Classification Search
None
See application file for complete search history.

(56) References Cited

U.S. PATENT DOCUMENTS

| 2006/0014485 | A1 | 1/2006 | Sousa et al. |
| 2007/0111653 | A1* | 5/2007 | Endou .................. B60H 1/3421 454/155 |

(Continued)

FOREIGN PATENT DOCUMENTS

| CN | 2813347 | 9/2006 |
| CN | 101169281 | 4/2008 |

(Continued)

OTHER PUBLICATIONS

English machine translation of DE 202004008181. www.espacenet.com. Jan. 4, 2016.*

*Primary Examiner* — Edmund Lee
(74) *Attorney, Agent, or Firm* — Joseph M. Butscher; The Small Patent Law Group, LLC

(57) ABSTRACT

In the manufacturing of an operating element (10) for an air vent, a first partial element (12) is manufactured from a hard component in a first injection molding process and a second partial element (14) is manufactured from a soft component in a second injection molding process. The second partial element (14) forms a bearing (20) for a support of the operating element (10) on a vane (22) of the air vent. During its manufacture, the second partial element (14) is connected with the first partial element (12) by adhesion and/or by geometric shaping. The two partial elements (12, 14) that are captively connected with each other constitute a prefabricated unit.

20 Claims, 6 Drawing Sheets

(51) Int. Cl.
*B29C 45/14* (2006.01)
*F24F 13/14* (2006.01)

(52) U.S. Cl.
CPC ...... *B29C 45/1657* (2013.01); *B29C 45/1676* (2013.01); *B60H 1/3414* (2013.01); *B29C 2045/1673* (2013.01); *B60H 2001/3492* (2013.01); *F24F 13/1426* (2013.01)

(56) References Cited

U.S. PATENT DOCUMENTS

| | | |
|---|---|---|
| 2008/0119124 A1 | 5/2008 | Okuno |
| 2008/0125026 A1 | 5/2008 | Shin |
| 2009/0286462 A1 | 11/2009 | Goto |
| 2010/0093269 A1 | 4/2010 | Sakaguchi et al. |

FOREIGN PATENT DOCUMENTS

| | | |
|---|---|---|
| CN | 101726079 | 10/2009 |
| DE | 69302830 | 10/1996 |
| DE | 202004008181 | 9/2004 |
| DE | 102006012473 | 9/2007 |
| DE | 202007008676 | 9/2007 |
| DE | 102009013256 | 10/2009 |
| EP | 0551882 | 7/1993 |
| GB | 1407992 | 10/1975 |
| JP | 2009154783 | 7/2009 |

\* cited by examiner

METHOD FOR PRODUCING A CONTROL ELEMENT FOR AN AIR-DIFFUSER

RELATED APPLICATIONS

This application corresponds to PCT/EP2011/003667, filed Jul. 21, 2011, which claims the benefit of German Application No. 10 2010 032 231.8, filed Jul. 26, 2010, the subject matter, of which are incorporated herein by reference in their entirety.

BACKGROUND OF THE INVENTION

The invention relates to a method of manufacturing an operating element for an air vent. The invention further relates to an operating element for an air vent. In addition, the invention relates to an air vent, in particular for a motor vehicle.

An air vent having an operating element arranged on a horizontal vane for controlling an air flow is disclosed in DE 10 2006 012 473 A1, for example. The operating element serves, for one thing, to pivot the vane about the longitudinal axis thereof and, for another thing, to control the air flow with respect to the horizontal direction thereof.

When provision is made for such an operating element to be shiftable on a vane, a bearing cushion made from a soft material may be provided. However, as a separate component, the bearing cushion requires an additional assembly step. In addition, an insert made of metal may be inserted in the grip portion of the operating element to provide a higher quality appearance. The insert also requires an additional assembly step.

SUMMARY OF THE INVENTION

The object of the invention is to simplify the assembly of an operating element having good sliding properties on a vane of an air vent.

This object is achieved by a method having the features given in claim 1. Advantageous and expedient further configurations of the method according to the invention are indicated in the dependent claims.

The method according to the invention of manufacturing an operating element for an air vent includes the steps of:
 manufacturing a first partial element from a hard component in a first injection molding process; and
 manufacturing a second partial element from a soft component in a second injection molding process.

According to the invention, the second partial element forms a sliding bearing for a support of the operating element on a vane of the air vent. During its manufacture, the second partial element is connected with the first partial element by adhesion and/or by geometric shaping. If the first partial element itself consists of a plurality of individual parts, the second partial element is connected with at least one of these individual parts.

The invention is based on the finding that for the bearing, a soft material with good sliding properties is of advantage for shifting the operating element on the vane. The invention makes provision for an operating element having partial elements of different hardnesses, the soft partial element constituting the bearing. The soft partial element is connected with the hard partial element as early as during manufacturing and constitutes a prefabricated, "off-tool" unit with the latter. Since there is no need to insert a separate bearing cushion into the operating element, the number of components and assembly expenditure are reduced.

According to a first alternative, the two partial elements can be manufactured together in a two-component injection molding process (2C process). As is usual in such a process, the material pairing for the two partial elements is selected such that they adhere to each other well.

According to a second alternative, the two partial elements can be manufactured together in an in-mold assembly process (IMA process). In this case the geometric shapes of the two partial elements are selected such that they are captively connected with each other after the injection molding process, without an adhesion being necessary for this. After injection molding, no assembly of the two partial elements is required in this case, either.

The two alternatives may, of course, also be combined with each other.

Silicones are very durable materials and have very good sliding properties. The soft component for the second partial element, which constitutes the bearing, therefore preferably comprises a silicone.

As an alternative, the soft component for the second partial element may comprise a thermoplastic elastomer. Thermoplastic elastomers are elastic and are well suited for injection molding processes.

A configuration of the operating element according to the invention in which the soft component forms a major part of the surface of the operating element is of particular advantage. In this case, the second partial element not only serves as a bearing, but furthermore provides for a pleasant haptics in operation.

The hard component for the first partial element, which is harder than the second partial element, may comprise a plastic material with a metallic effect.

The advantage of such a material for the hard component is especially well apparent if the second injection molding process is carried out such that an end of the first partial element remains visible. The visible metal appearance increases the visual appeal of the operating element, without a separate metal insert or metal clip being necessary for this, as has been used until now.

According to a preferred embodiment of the method according to the invention, the second injection molding process is carried out in an injection molding die having a core puller that is pulled by a defined length to expose a channel in the first partial element, for the soft component to advance therethrough into the interior of the first partial element to form the bearing.

To simplify the assembly on a horizontal vane, the first partial element of the operating element may be made up of a plurality of individual parts, including a rear part provided for attachment to a vane rear side and a front part provided for attachment to a vane front side.

In such a configuration, the second partial element may be connected either with the rear part or with the front part of the first partial element during its manufacture.

A further subject matter of the invention is an operating element for an air vent having the features indicated in claim 12. The operating element according to the invention includes a first partial element made from a hard component and a second partial element that is made from a soft component and forms a sliding bearing for a support of the operating element on a vane of the air vent. The second partial element adheres to the first partial element and/or is captively connected with the first partial element by geometric shaping, thus constituting a prefabricated unit.

The invention further provides an air vent, in particular for a motor vehicle, having the features indicated in claim 13. The air vent according to the invention includes a plurality of adjustable vanes for controlling an air flow and an operating element according to the invention that is arranged on one of the vanes.

BRIEF DESCRIPTION OF THE DRAWINGS

Further features and advantages will be apparent from the description below and from the accompanying drawings, to which reference is made and in which.

DESCRIPTION OF EXEMPLARY EMBODIMENTS

In the description below of the preferred embodiments of the invention, the particulars "front", "rear", "horizontal", "vertical", etc. are related to the usual installation situation, known to a person skilled in the art, of an air vent in a motor vehicle, the term "front side", for example, denoting the side facing the interior to be ventilated.

Figure 1:
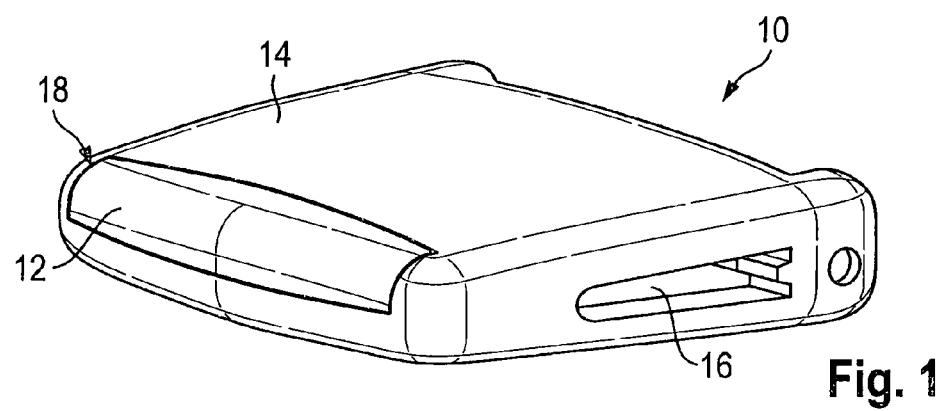
FIG. 1 shows a perspective front/side view of an operating element according to a first embodiment of the invention.
Figure 2:
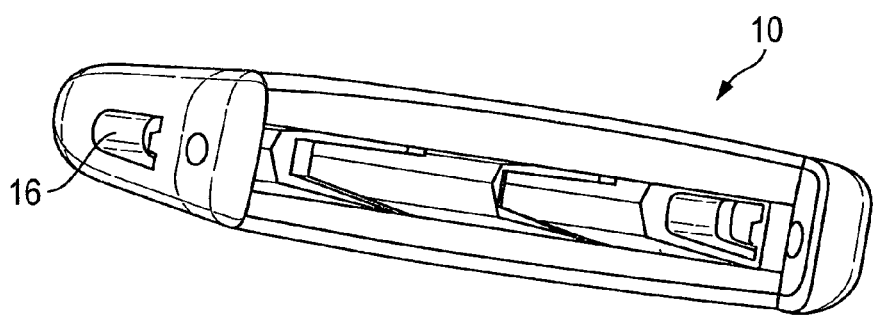
FIG. 2 shows a perspective rear view of the operating element from FIG. 1.

FIGS. 1 and 2 show a first embodiment of an operating element 10 for an air vent. The operating element 10 is essentially comprised of two partial elements 12, 14, which are connected with each other. A flat passage 16 extends transversely from one side to the opposite side through the entire operating element 10.

The first partial element 12 is almost completely surrounded by the second partial element 14, in particular in that area which is touched by the user during operation. The front end of the first partial element 12 is, however, visible through a recess 18 of the second partial element 14 on the front side of the operating element.

Figure 3:
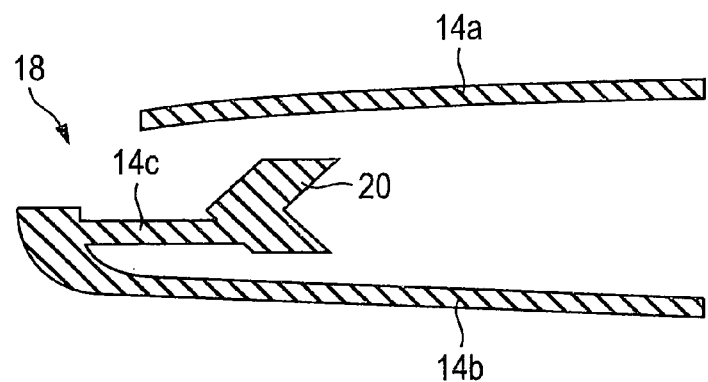
FIG. 3 shows a sectional view of the second partial element of the operating element from FIG. 1.

As can be seen in FIG. 3, the second partial element 14 includes an upper section 14a and a lower section 14b as well as a middle section 14c, which extends inwards from an upwardly curved front region of the lower section 14b. The middle section 14e constitutes a bearing 20, more precisely a sliding bearing in the form of a pad, for a support of the operating element 10 on a horizontal vane of the air vent.

Figure 4:
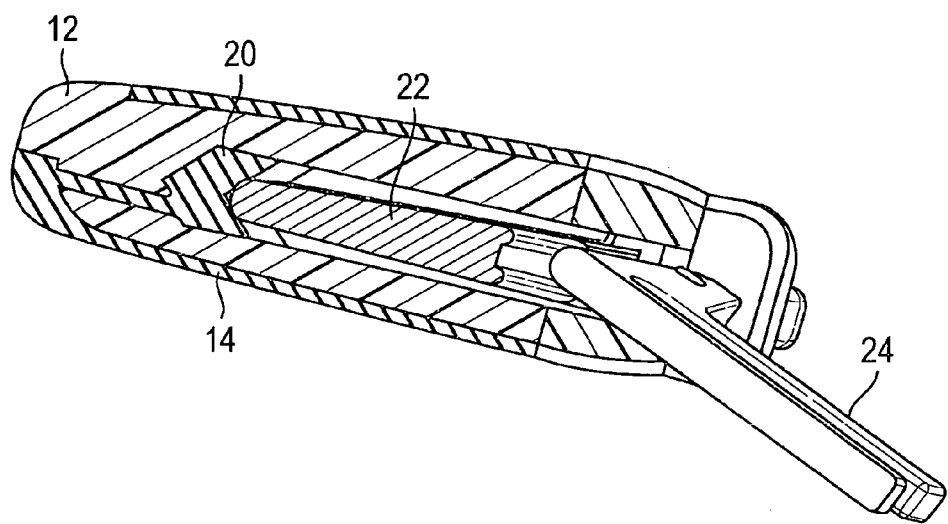
FIG. 4 shows a perspective, sectional side view of the operating element from FIG. 1 on a vane.
Figure 5:
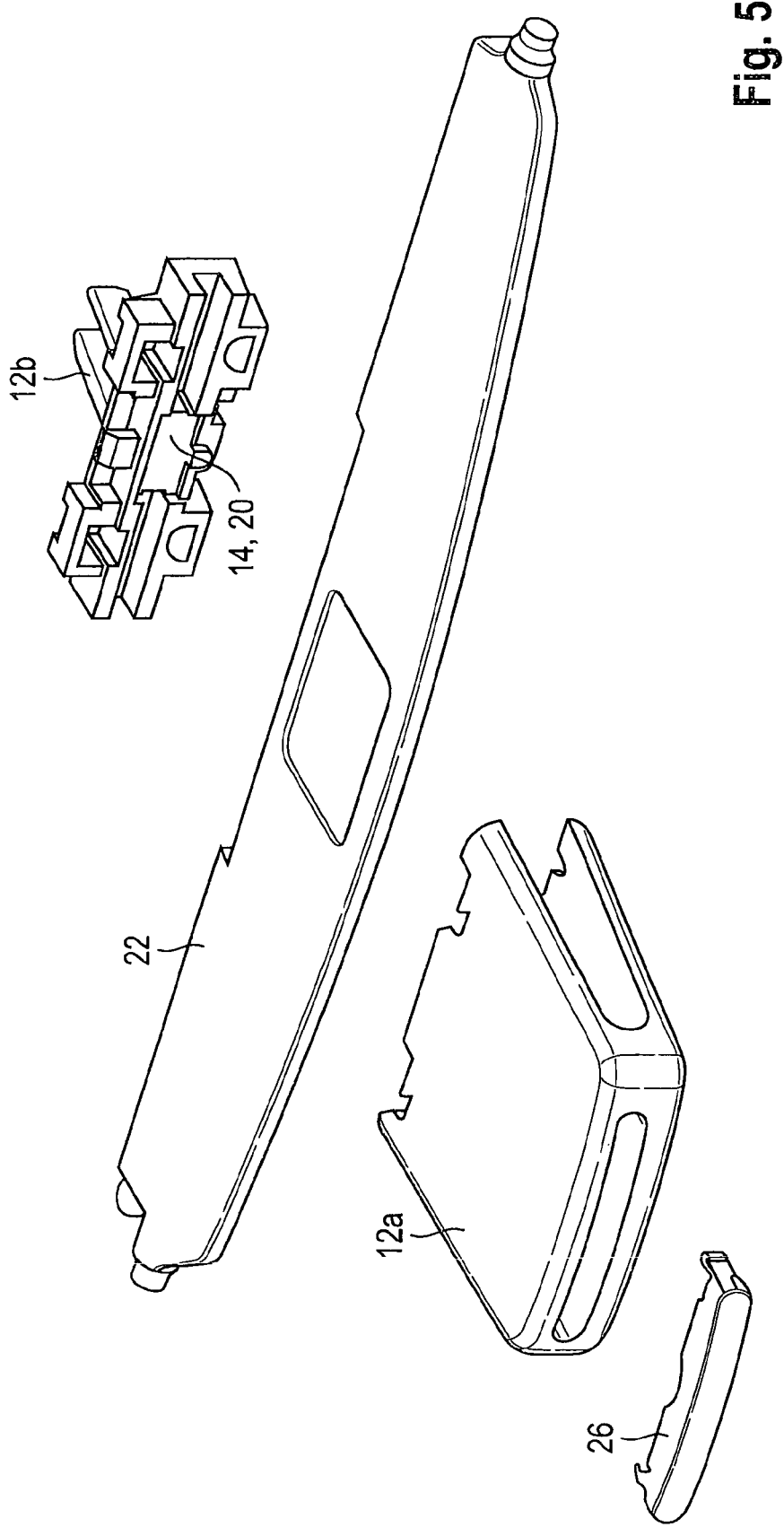
FIG. 5 shows an exploded view of an operating element according to a second embodiment of the invention, with a vane.

FIG. 4 shows the operating element 10 mounted on a horizontal vane 22 of the air vent. The flat vane 22 projects through the passage 16 of the operating element 10 and its front side rests against the bearing 20. The operating element 10 is shiftable on the vane 22 in the horizontal direction. The operating element 10 can be clipped to a vertical vane (not shown) of the air vent by means of detent arms 24, as a result of which the shiftability in the horizontal direction is maintained to a limited extent.

The first partial element 12 consists of an injection moldable hard component, in particular of a plastic material with a metallic effect. Since the front end of the first partial element 12 is visible through the recess 18, the operating element 10 has a higher quality appearance than an operating element that is purely made of a plastic material. The second partial element 14 consists of an injection moldable soft component, in particular of a silicone or a thermoplastic elastomer having good haptic and sliding properties.

The two partial elements 12, 14 are connected with each other as early as during their manufacture. The two partial elements 12, 14 may be injection molded one after the other in a two-component injection molding process (2C process), the materials being selected such that good adhesion of the second partial element 14 to the first partial element 12 is ensured. In the second injection molding process, a core puller of the injection molding die is pulled by a defined length to expose a channel in the first partial element 12 for the soft component to advance therethrough into the interior of the first partial element 12 to form the bearing 20.

As an alternative, the two partial elements 12, 14 may also be manufactured using an in-mold assembly technology (IMA technology) to be connected with each other. The shapes of the two partial elements 12, 14 are in this case selected such that, after injection molding of the two partial elements 12, 14, they are captively connected with each other without an adhesion being absolutely necessary herefor. Nonetheless, by selecting appropriate materials, an adhesion can assist the connection.

A second embodiment of the operating element 10 is illustrated in FIGS. 5 to 8. As is apparent from FIG. 5, the first partial element 12 here consists of a plurality of individual parts, more specifically a front part 12a that is provided for attachment to the front side of the horizontal vane 22, and a rear part 12b that is provided for attachment to the rear side of the vane 22. In addition, the operating element 10 further includes a chrome insert 26.

Figure 6:
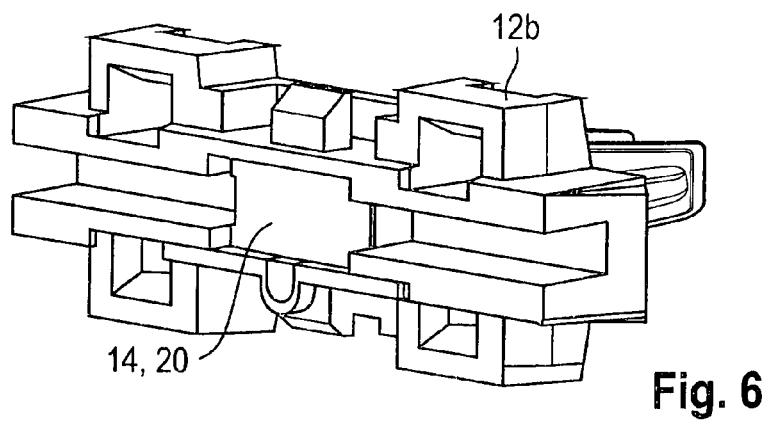
FIG. 6 shows a perspective front view of the rear part of the first partial element and of the second partial element of the operating element from FIG. 5.

In the second embodiment, the second partial element 14 is connected with the rear part 12b of the first partial element 12, as can best be seen in FIG. 6. Again, the connection may be obtained be a two-component injection molding process using materials that adhere well to each other and/or in an IMA technology by an appropriate shaping of the rear part 12b and of the second partial element 14. Since in this embodiment provision is made for the separate chrome insert 26, the hard component for the first partial element 12 need not have a metallic effect.

Figure 7:
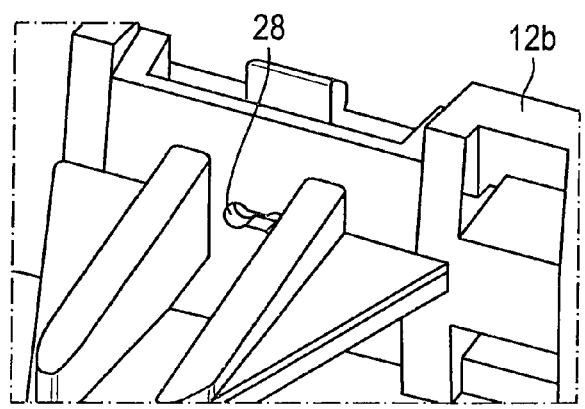
FIG. 7 shows a perspective rear view of a detail from FIG. 5.
Figure 8:
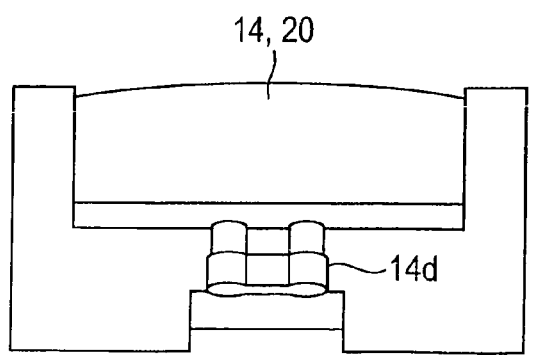
FIG. 8 shows a perspective sectional top view of a detail from FIG. 5.
Figure 9:
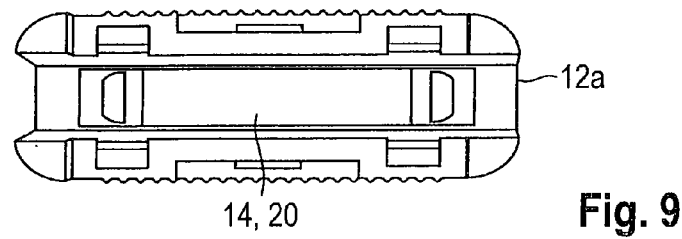
FIG. 9 shows a perspective rear view of the front part of the first partial element and of the second partial element of an operating element according to a third embodiment of the invention.
Figure 10:
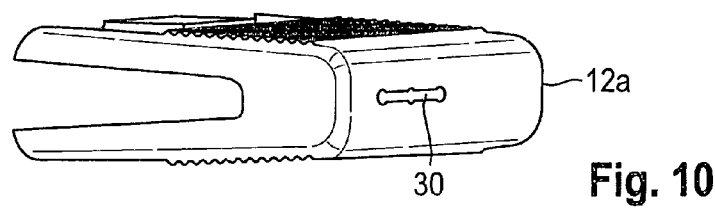
FIG. 10 shows a perspective side view of the first partial element from FIG. 9.

FIG. 7 shows an aperture 28 in the rear part 12b of the first partial element 12, the soft component being injected through this aperture from the rear side. FIG. 8 shows the second partial element 14 having a thickened portion 14d, provided in accordance with the IMA technology, on the rear side of the aperture 28 of the rear part 12b. The thickened portion 14d is larger than or has a contour that is different from that of the aperture 28, so that the second partial element 14 can not fall out forward if it does not adhere to the rear part 12b.

The assembly of the operating part 10 provides for the chrome insert 26 to be clipped into the front part 12a of the first partial element, and for the front part to be fitted onto the front side of the vane 22 and the rear part 12b with the second partial element 14 to be fitted onto the rear side of the vane 22, the front part 12a and the rear part 12b being connected with each other by a detent connection. Owing to the second partial element 14, which constitutes the sliding bearing 20 in the form of a cushion, the finished operating part 10 is then horizontally shiftable on the vane 22.

The third embodiment of the operating element 10 as shown in FIGS. 9 to 12 differs from the second embodiment in particular in that the second partial element 14 is connected with the front part 12a of the first partial element 12, rather than with the rear part 12b. The bearing 20 is again located in the interior of the first partial element 12 and faces the front side of the horizontal vane 22.

Figure 11:
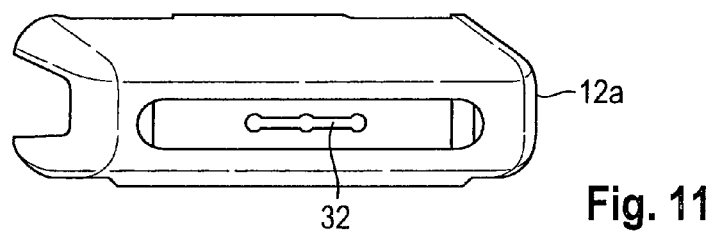
FIG. 11 shows a perspective front view of the first partial element according to a variant of the third embodiment.
Figure 12:
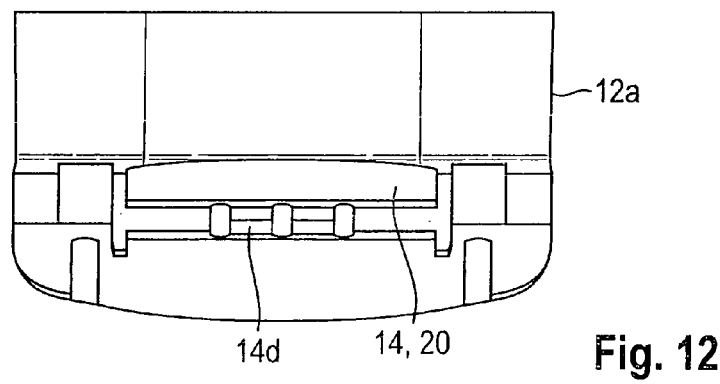
FIG. 12 shows a perspective sectional top view of a detail of the front part of the first partial element and the second partial element from FIG. 9.

The soft component for the second partial element 14 may be injected either through a lateral aperture 30 in the front part 12a (see FIG. 10) or a front side aperture 32 of the front part 12a (see FIG. 11). FIG. 12 shows the second partial element 14, which was injected through the aperture 32 on the front side of the front part 12a and is provided with a thickened portion 14d in the form of a web on the front side of the aperture 32, in accordance with the IMA technology. The shape of the thickened portion 14d does not correspond to that of the aperture 32, so that the second partial element 14 is prevented from falling out of the front part 12a.

Figure 13:
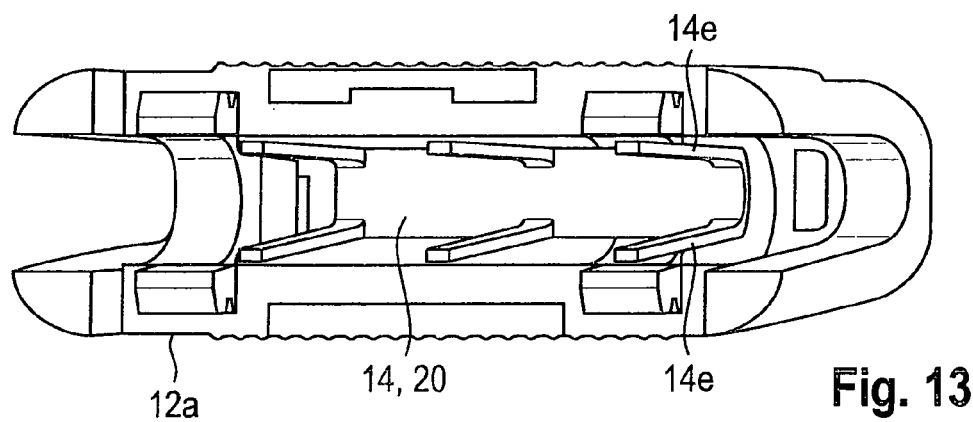
FIG. 13 shows a perspective rear view of the front part of the first partial element and of the second partial element of an operating element according to a fourth embodiment of the invention.
Figure 14:
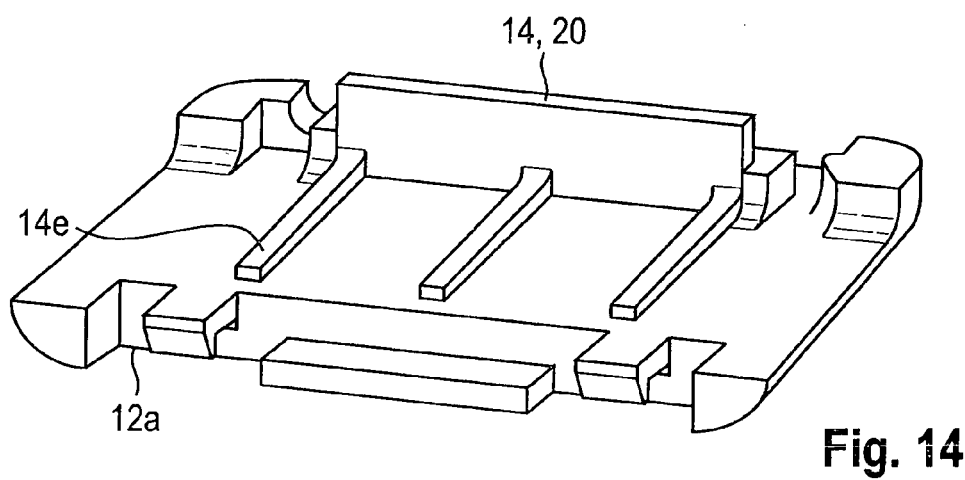
FIG. 14 shows a perspective sectional top view of the front part of the first partial element and the second partial element from FIG. 13.

The fourth embodiment of the operating element 10 shown in FIGS. 13 and 14 largely corresponds to the third embodiment, with the difference that the second partial element 14 includes a plurality of ribs 14e which extend in the horizontal direction transversely to the longitudinal axis of the horizontal vane 22. The ribs 14e primarily serve to adjust the shifting force and the movement behavior of the operating element 10 on the vane 22.

It is basically possible in all embodiments to fasten the operating element 10 also to a horizontal vane 22 by means of the detent arms 24 and to support it for sliding movement on a vertical vane. The result in this case is an orientation of the operating element 10 substantially rotated through 90 degrees.

LIST OF REFERENCE NUMBERS 10 operating element
12 first partial element
12a front part
12b rear part
14 second partial element
14a upper section
14b lower section
14c middle section
14d thickened portion
14e ribs
16 passage
18 recess
20 bearing
22 vane
24 detent arms
26 chrome insert
28 aperture in rear part
30 lateral aperture in front part
32 front side aperture in front part

The invention claimed is:

1. A method of manufacturing an operating element for an air vent, comprising:
   manufacturing a first partial element from a hard component having a first hardness in a first injection molding process;
   manufacturing a second partial element from a soft component having a second hardness in a second injection molding process, the second hardness being less than the first hardness; and
   coupling the second partial element manufactured from the soft component to the first partial element manufactured from the first partial element so that at least one surface of the second partial element manufactured from the soft component is exposed in relation to the operating element,
   wherein the second partial element forms a bearing for a support of the operating element on a vane of the air vent and is connected with the first partial element by adhesion and/or by geometric shaping during its manufacture.

2. The method according to claim 1, wherein the two partial elements are manufactured together in one of a two-component injection molding process, or an in-mold assembly process.

3. The method according to claim 1, wherein the soft component for the second partial element comprises a silicone.

4. The method according to claim 1, wherein the soft component for the second partial element comprises a thermoplastic elastomer.

5. The method according to claim 1, wherein the hard component for the first partial element comprises a plastic material with a metallic effect.

6. The method according to claim 5, wherein the second injection molding process is carried out such that an end of the first partial element remains visible.

7. The method according to claim 1, wherein the second injection molding process is carried out in an injection molding die having a core puller that is pulled by a defined length to keep a channel in the first partial element free, for the soft component to advance therethrough into the interior of the first partial element to form the bearing.

8. The method according to claim 1, wherein the first partial element is made up of a plurality of individual parts, including a rear part provided for attachment to a vane rear side and a front part provided for attachment to a vane front side, the second partial element being connected with the rear part of the first partial element during its manufacture.

9. The method according to claim 1, wherein the first partial element is made up of a plurality of individual parts, including a rear part provided for attachment to a vane rear side and a front part provided for attachment to a vane front side, the second partial element being connected with the front part (12a) of the first partial element during its manufacture.

10. The method according to claim 1, wherein the operating element slides along the vane to control a direction of air flowing from the air vent.

11. The method according to claim 1, wherein the second partial element is connected with the first partial element by adhesion.

12. The method according to claim 1, wherein the second partial element is connected with the first partial element by geometric shaping.

13. The method according to claim 1, wherein the coupling comprises substantially surrounding the first partial element manufactured from the hard component with the second partial element manufactured from the soft component.

14. The method according to claim 13, wherein the substantially surrounding the first partial element manufactured from the hard component with the second partial element manufactured from the soft component comprises exposing at least a portion of the first partial element manufactured from the hard component through a recess formed in the second partial element formed through the second partial element manufactured from the soft component.

15. The method according to claim 1, wherein the coupling comprises forming the second partial component manufactured from the soft component around at least a portion of the first partial element manufactured from the hard component so that the second partial component manufactured from the soft component is configured to be touched by a user during operation of the operating element.

16. The method according to claim 1, further comprising coupling a chrome insert to one or both of the first partial element manufactured from the hard component or the second partial element manufactured from the soft component.

17. The method according to claim 1, wherein the coupling comprises using the second injection molding process to inject the soft component through an aperture formed through the first partial element manufactured from the hard component to form the second partial component manufactured from the soft component.

18. A method of manufacturing an operating element for an air vent, comprising:
 manufacturing a first partial element from a hard component having a first hardness in a first injection molding process;
 manufacturing a second partial element from a soft component having a second hardness in a second injection molding process, the second hardness being less than the first hardness; and
 coupling the second partial element manufactured from the soft component to the first partial element manufactured from the first partial element so that at least one surface of the second partial element manufactured from the soft component is exposed in relation to the operating element,
 wherein the coupling comprises substantially surrounding the first partial element manufactured from the hard component with the second partial element manufactured from the soft component, and forming the second partial component manufactured from the soft component around at least a portion of the first partial element manufactured from the hard component so that the second partial component manufactured from the soft component is configured to be touched by a user during operation of the operating element,
 wherein the substantially surrounding the first partial element manufactured from the hard component with the second partial element manufactured from the soft component comprises exposing at least a portion of the first partial element manufactured from the hard component through a recess formed in the second partial element formed through the second partial element manufactured from the soft component,
 wherein the second partial element forms a bearing for a support of the operating element on a vane of the air vent and is connected with the first partial element by adhesion and/or by geometric shaping during its manufacture.

19. The method according to claim 18, wherein the second injection molding process is carried out in an injection molding die having a core puller that is pulled by a defined length to keep a channel in the first partial element free, for the soft component to advance therethrough into the interior of the first partial element to form the bearing.

20. The method according to claim 18, further comprising coupling a chrome insert to one or both of the first partial element manufactured from the hard component or the second partial element manufactured from the soft component.

* * * * *